(12) United States Patent
Yoneyama et al.

(10) Patent No.: US 6,231,282 B1
(45) Date of Patent: May 15, 2001

(54) TWO-SURFACE CONSTRAINABLE TOOL

(75) Inventors: Masayoshi Yoneyama; Husao Sakai, both of Shizuoka-ken; Michio Mori, Numazu, all of (JP)

(73) Assignee: Toshiba Kikai Kabushiki Kaisha, Tokyo-to (JP)

( * ) Notice: Subject to any disclaimer, the term of this patent is extended or adjusted under 35 U.S.C. 154(b) by 0 days.

(21) Appl. No.: 09/398,420

(22) Filed: Sep. 17, 1999

(30) Foreign Application Priority Data

Sep. 17, 1998 (JP) .................................................. 10-263445

(51) Int. Cl.⁷ ...................................................... B23C 1/00
(52) U.S. Cl. ........................ 409/234; 408/239 A; 409/232
(58) Field of Search ................................ 409/131, 141, 409/143, 232, 233, 234; 408/239 A, 239 R; 483/1; 279/103, 158; 29/447

(56) References Cited

U.S. PATENT DOCUMENTS

| | | | | |
|---|---|---|---|---|
| 4,673,319 | * | 6/1987 | Ishikawa | 409/234 |
| 4,714,389 | * | 12/1987 | Johne | 409/233 |
| 4,840,520 | * | 6/1989 | Pfalzgraf | 409/232 |
| 4,902,177 | * | 2/1990 | Burnett | 409/234 |
| 5,118,231 | * | 6/1992 | Daniels | 409/232 |
| 5,322,304 | * | 6/1994 | Rivin | 279/103 |
| 5,595,391 | * | 1/1997 | Rivin | 279/103 |
| 5,775,857 | * | 7/1998 | Johne | 409/234 |
| 5,975,816 | * | 11/1999 | Cook | 409/131 |

\* cited by examiner

*Primary Examiner*—Daniel W. Howell
(74) *Attorney, Agent, or Firm*—Pillsbury Winthrop LLP

(57) ABSTRACT

A two-surface constrainable tool has two retaining surfaces by which the two-surface constrainable tool retains itself on a spindle (10) of a machine tool. The two-surface constrainable tool comprises: a bottom grip taper shank (14) having a taper part (15) having a first retaining surface and capable of being closely fitted in a taper bore (12) formed in the spindle (10), and a flange (16) provided in one end surface (16*a*) thereof facing the end surface (10*a*) of the spindle (10) with a groove (18); and a collar (20) to be interposed between the end surface (16*a*) of the flange (16) and the end surface (10*a*) of the spindle (10), consisting of two symmetrical segments (20*a*, 20*b*) having ridges (22*a*, 22*b*) to be fitted in the groove (18) of the flange (16), and a second retaining surface to be brought into close contact with the end surface (10*a*) of the spindle (10). The bottom grip taper shank (14) retains itself by the first and the second retaining surface on the spindle (10).

5 Claims, 4 Drawing Sheets

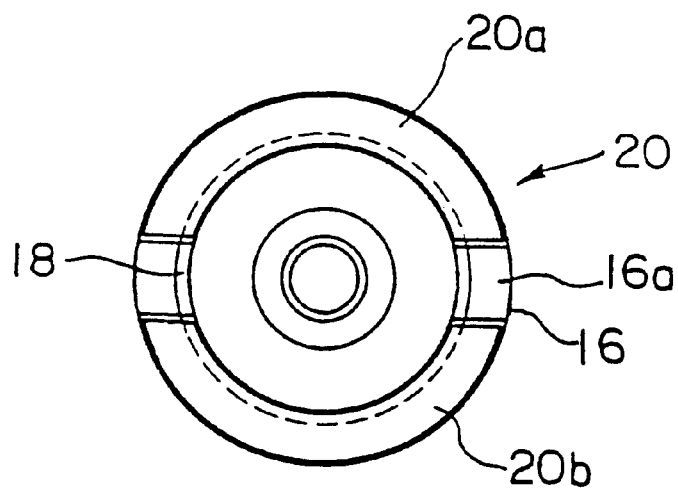
F I G. 2
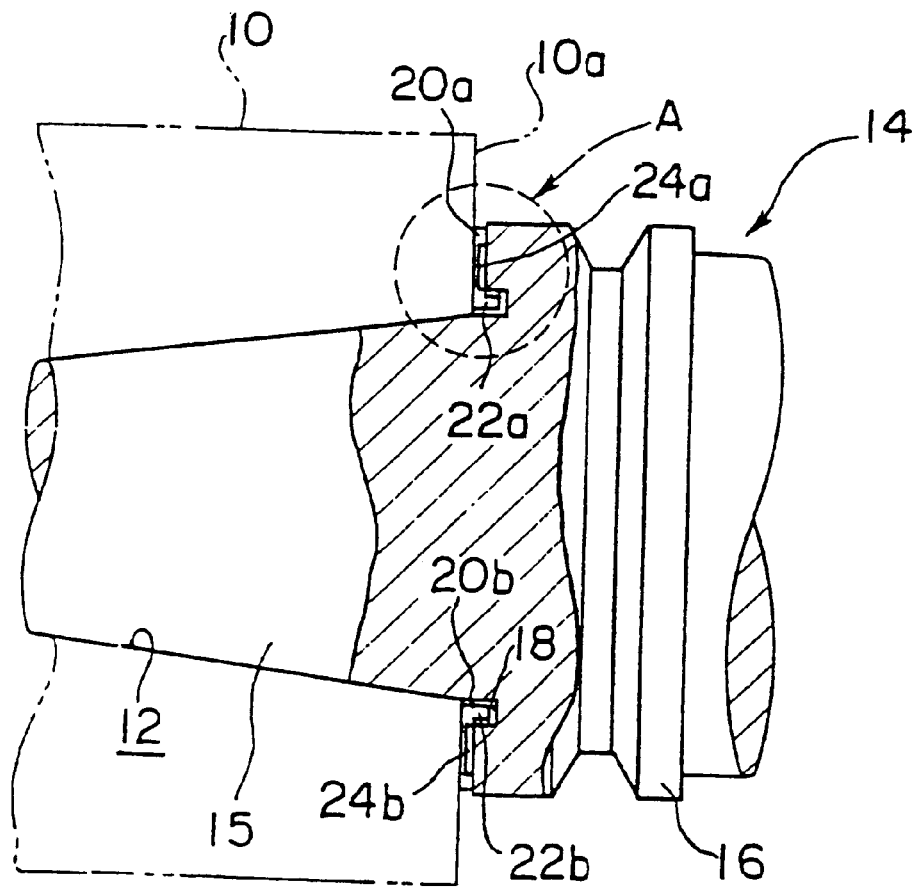
F I G. 3

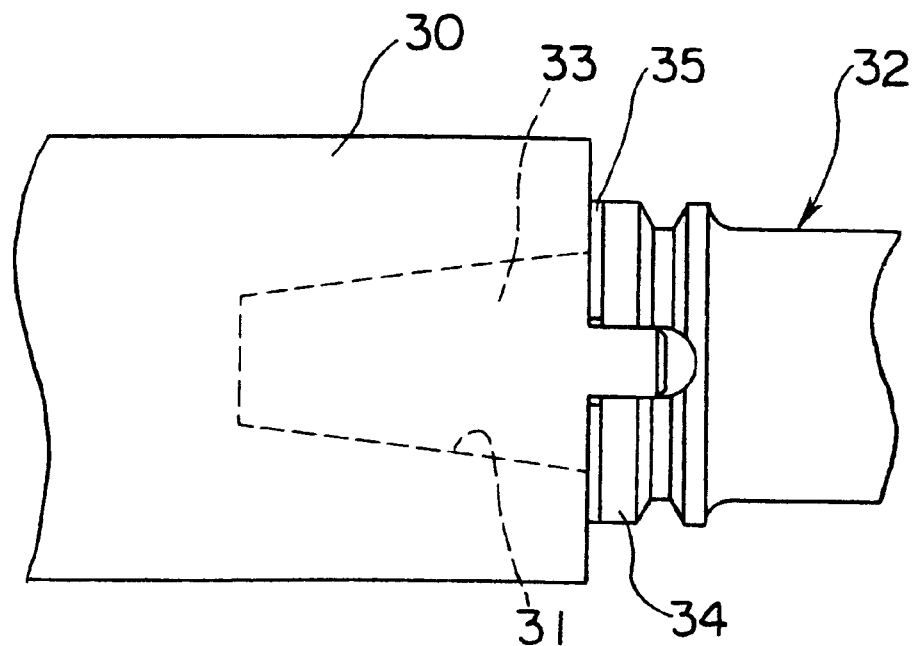
F I G. 6
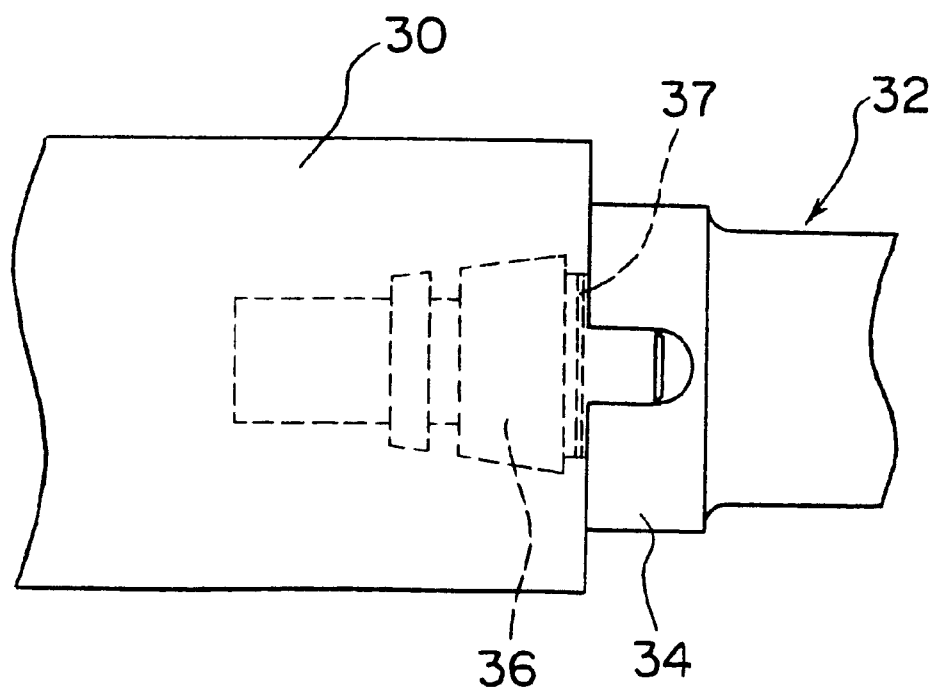
F I G. 7

TWO-SURFACE CONSTRAINABLE TOOL

BACKGROUND OF THE INVENTION

1. Field of the Invention

The present invention relates to a tool to be fitted to a spindle included in a machine tool, such as a machining center and, more particularly, to a two-surface constrainable tool having a bottom grip taper shank (BT shank) with a conical taper shank and a flange to be constrained.

2. Description of the Related Art

BT shanks are used widely as shanks for standard tools for machining centers. The BT shank is mounted on a spindle with its taper shank fitted closely in the conical taper bore of the spindle. The recent progress of machining centers which achieve high performance in spindle speed and machining efficiency has brought about new problems in BT shanks. For example, a front end portion of the spindle surrounding the conical taper bore is caused to expand because of its high speed rotation and the tool holding firmness of the spindle is reduced. Consequently, the tool becomes unstable and chatters, and the positional accuracy of the cutting edge of the tool is deteriorated.

A new tool which has a BT shank with a taper part and a flange has been developed to solve such a problem. The taper part of the BT shank is fitted closely in the conical taper hole of a spindle and the flange is brought into contact with the end surface of the spindle to hold the tool securely on the spindle in a state of two-surface constraint. Known two-surface constrainable tools are shown in FIGS. 6 and 7.

FIG. 6 shows a two-surface constrainable tool known as a collar adjustment type. In FIG. 6 indicated at 30 is a spindle and at 32 is a BT shank. A taper part 33 of the BT shank 32 is fitted in a conical taper bore 31 formed in the spindle 30. A collar 35 is inserted into a clearance between the end surface of the spindle 30 and the end surface of a flange 34. According to the collar adjustment type, the taper part 33 of the tool is constrained by the inner surface of the conical taper bore 31, and the flange 34 of the same is constrained by the collar 35 in close contact with the end surface of the spindle 30.

FIG. 7 shows a two-surface constrainable tool known as of a century type. This tool has a BT shank 32 having a short taper part 36 and a flange 34. A disk spring 37 is placed in a clearance between the flange 34 and the end surface of a spindle 30 to facilitate pushing the short taper part 36 of the BT shank 32 into a taper bore formed in the spindle 30 and to enhance cutting vibration damping effect.

As to the BT shank 32 of the collar adjustment type retained in the two-surface constrained state, the collar 35 subjected to the centrifugal force is caused to loosen and the stiffness of contact between the collar 35 and the end surface of the spindle 30 decreases when the spindle 30 rotates at a high rotating speed.

On the other hand, the taper part 36 of the tool of the century type does not have a enough contact area to keep reliable contact with the surface of taper bore 31, and the tool is liable to play axially. There is an opinion that the tool of a century type is unsuitable for high-speed heavy machining.

SUMMARY OF THE INVENTION

Accordingly, it is an object of the present invention to solve those problems in the prior art and to provide a two-surface constrainable tool capable of securely holding a collar between the end surface of a spindle and the end surface of the flange without allowing the collar to loosen or fall off and of being used for high-speed machining.

According to one aspect of the present invention, a two-surface constrainable tool having two constrained surfaces on an end portion of a spindle provided with a conical tapered bore and an end surface, said two-surface constrainable tool comprises a bottom grip taper shank having a taper part provided with a first constrained surface and capable of being closely fitted in the conical tapered bore of the spindle, and a flange provided on one end surface thereof facing the end surface of the spindle with a groove; and a collar to be interposed between the end surface of the flange and the end surface of the spindle, having a ridge to be fitted in the groove of the flange, and a second constrained surface to be brought into close contact with the end surface of the spindle.

When the bottom grip taper shank is mounted on the spindle, the tapered conical surface of the taper part in close contact with the inner conical surface of the taper bore of the spindle serves as a first constrained surface, and the end surface of the flange resting through the collar on the end surface of the spindle serves as a second constrained surface. Since the two-surface constrainable tool thus retains itself by the two retaining surfaces on the spindle, the tool holding firmness of the spindle is not reduced even if the spindle rotates at a high rotating speed.

BRIEF DESCRIPTION OF THE DRAWINGS

The above and other objects, features and advantages of the present invention will become more apparent from the following description taken in connection with the accompanying drawings, in which:

FIG. 2 is an end view of the two-surface constrainable tool shown in FIG. 1 taken in the direction of the arrow in FIG. 1;

FIG. 3 is a longitudinal sectional view of a two-surface constrainable tool in a second embodiment according to the present invention;

FIG. 6 is a side elevation of a conventional two-surface constrainable tool; and FIG. 7 is a side elevation of another conventional two-surface constrainable tool.

DESCRIPTION OF THE PREFERRED EMBODIMENTS

Figure 1:
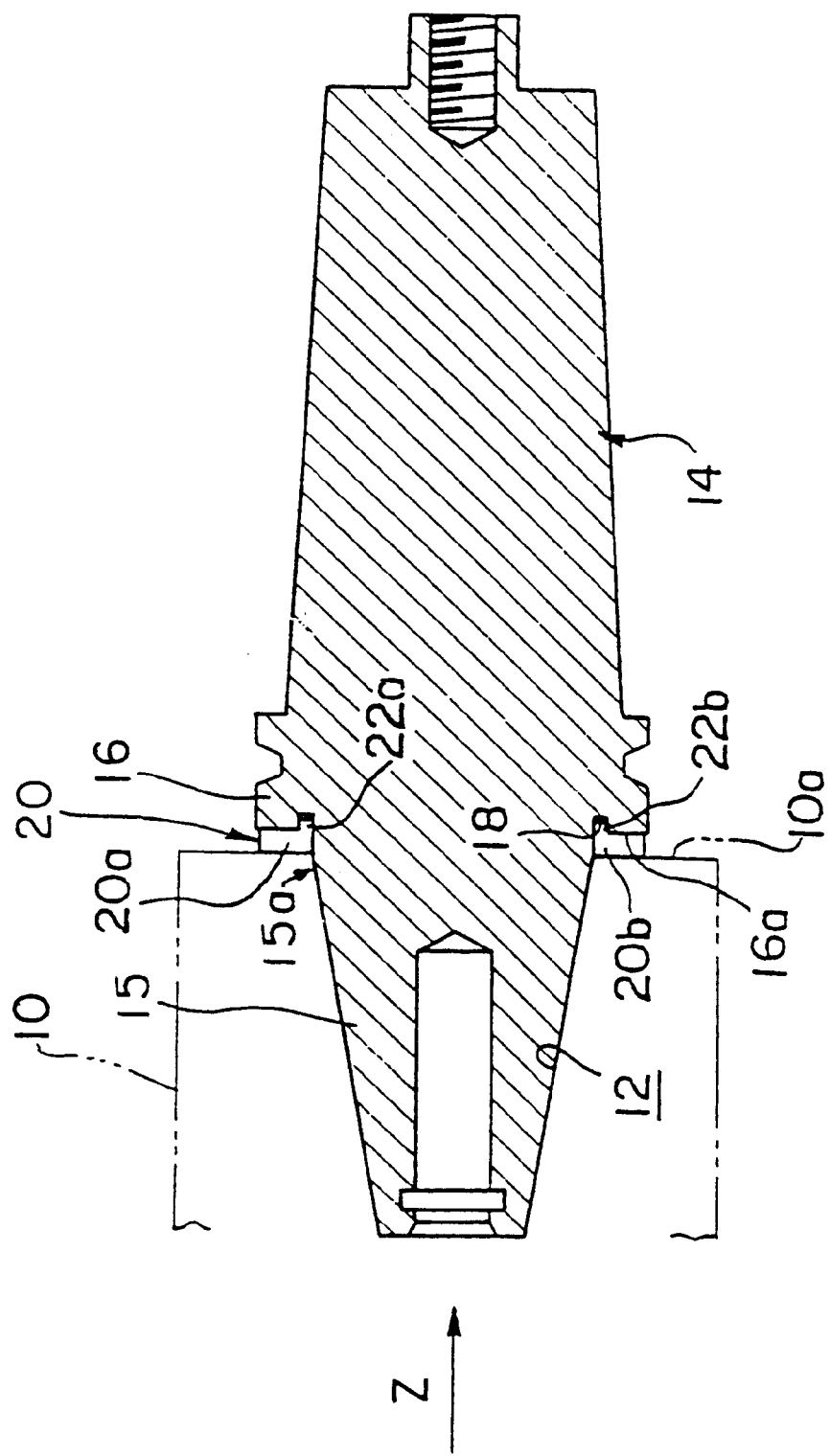
FIG. 1 is a longitudinal sectional view of a two-surface constrainable tool in a first embodiment according to the present invention.

FIG. 1 shows a two-surface constrainable tool in a first embodiment according to the present invention in a longitudinal sectional view, a spindle 10 of a machine tool has a taper bore 12 with a inner conical surface. The two-surface constrainable tool has a BT shank 14 which has a taper part 15 with a tapered conical surface formed in one end part thereof. When the taper part 15 is inserted in the taper bore 12 of the spindle 10, the tapered conical surface of the taper part 15 comes into close contact with the inner conical surface of the taper bore 12. The BT shank 14 is provided with a flange 16 continuous with a base end part 15a of the taper part 15. A cutting part, not shown, is attached to the other end part of the BT shank 14.

The flange 16 of the BT shank 14 has an end surface 16a which extends in parallel to the end surface 10a of the spindle 10 when the taper part 15 of the BT shank 14 is fitted in the taper bore 12 of the spindle 10. An annular groove 18 is formed in the end surface 16a of the flange 16 so as to surround the base end part of the taper part 15. As shown in FIG. 2, a collar 20 consisting of a pair of segments 20a and 20b is fitted in a clearance between the end surface of the spindle 10 and the end surface 16a of the flange 16. The thickness of the collar 20 is specific to the two-surface constrainable tool in use.

The collar segments 20a and 20b have the shape of a symmetrical half of a circular ring as shown in FIG. 2. The outside and the inside diameter of the collar 20 are approximately equal to the outside and the inside diameter of the end surface 16a of the flange 16.

The collar segments 20a and 20b of the collar 20 are provided with circular ridges 22a and 22b, respectively, extending circumferentially around the inner circumference of the collar 20. The circular ridges 22a and 22b are adapted to be fitted in an annular groove 18 formed circumferentially in the end surface 16a of the flange 16.

As shown in FIG. 1, the BT shank 14 is mounted on the spindle 10 with the collar segments 20a and 20b of the collar 20 being interposed between the end surface 10a of the spindle 10 and the end surface 16a of the flange 16. A draw bar, (not shown), connected to a clamping mechanism which generates a clamping force, and a collet attachment connected, (not shown), connected to the draw bar are disposed in the spindle 10. The collet attachment holds a pull stud attached to an end of the flange 16, and a high clamping force is exerted on the draw bar to pull the BT shank 14 into the spindle 10 inwardly.

When the BT shank 14 is clamped on the spindle 10, the tapered conical surface of the taper part 15, which is kept in reliable close contact with the inner conical surface of the taper bore 12, serves as a first constrained surface. The end surface 16a of the flange 16, which rests through the collar segments 20a and 20b of the collar 20 on the end surface 10a of the spindle 10, serves as a second constrained surface. Since the BS shank 14 retains itself on the spindle 10 by the first and the second retaining surface, the BT shank 14 can securely be held on the spindle 10 even if the spindle 10 rotates at a ultra-high rotating speed.

Since the circular ridges 22a and 22b of the collar segments 20a and 20b are fitted in the annular groove 18 formed in the end surface 16a of the flange 16, the firmness of engagement of the segments 20a and 20b with the flange 16 can be strengthened as centrifugal force acting on the collar segments 20a and 20b grows greater with the increase of the rotating speed of the spindle 10. Therefore, the collar segments 20a and 20b will not become loose or suffered a damage and will not fall off. Since the entire contact area of the tapered conical surface of the taper bore 12 can be used for constraining the taper part 15, the BT shank 14 is deterred from axial movement relative to the spindle 10.

Figure 4:
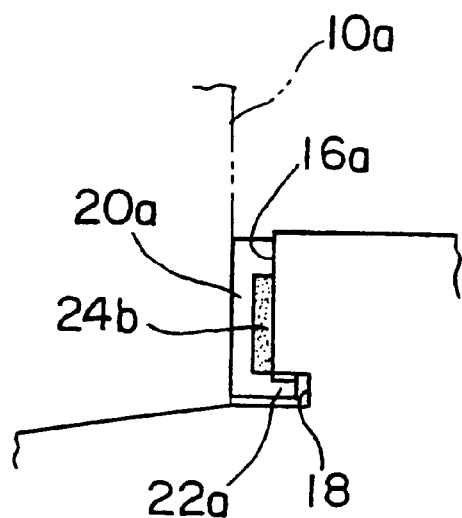
FIG. 4 is an enlarged view of a part A in FIG. 3.
Figure 5:
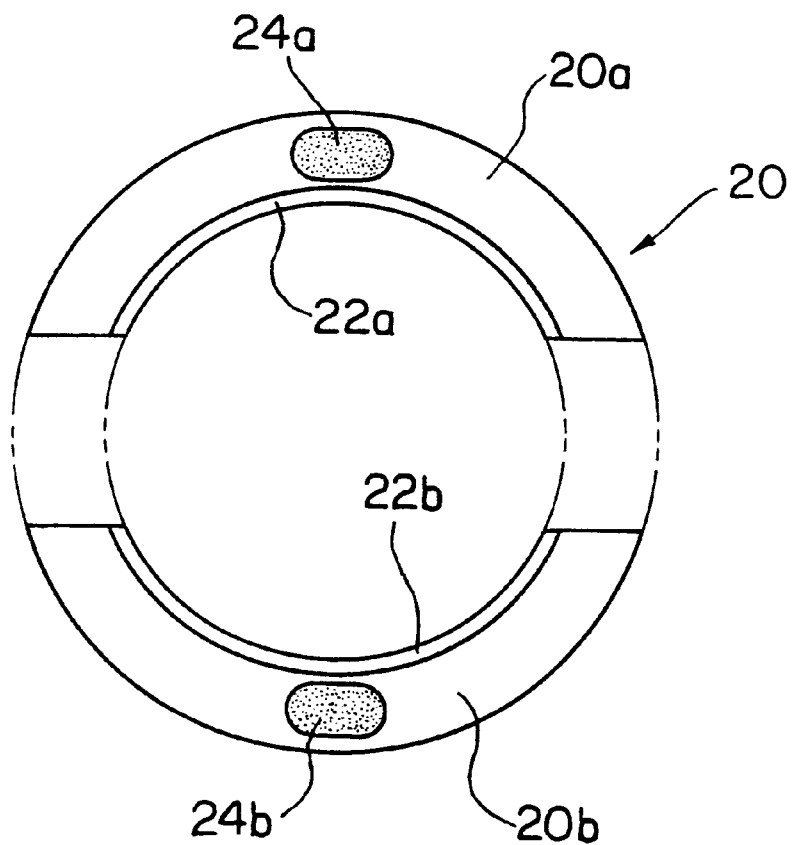
FIG. 5 is a front view of a collar.

A two-surface retainable tool in a second embodiment according to the present invention will be described with reference to FIGS. 3 to 5, in which parts like or corresponding to those of the first embodiment shown in FIGS. 1 and 2 are designated by the same reference characters.

The two-surface constrainable tool in the second embodiment has a collar 20 consisting of collar segments 20a and 20b respectively with circular ridges 22a and 22b as same as the first embodiment. But the collar segments 20a and 20b are provided, respectively, with magnets 24a and 24b embedded in a surface thereof on the same side of the circular ridges 22a and 22b so as to attach the segments 20a and 20b magnetically attached to a BT shaft 14. The surfaces of the magnets 24a and 24b are flush with the surfaces of the segments 20a and 20b, respectively. The segments 20a and 20b can be attached to and end surface 16a of the flange 16 with ease by the magnetic attraction of the magnets 24a and 24b simply by putting the segments 20a and 20b on the end surface 16a with the circular ridges 22a and 22b fitted in the annular groove 18 formed in the end surface 16a of the flange 16.

As is apparent from the foregoing description, according to the present invention, the collar held between the end surface of the flange of the BT shank and the end surface of the spindle will not become loose and will not come off, and the two-surface constrainable tool can be securely retained itself on the spindle for high-speed machining operation.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A two-surface constrainable tool having two surfaces to be constrained and being configured to be mounted on an end portion of a spindle, said spindle having an end surface and a conical tapered bore with a conical, tapered bore surface, said two-surface constrainable tool comprising:

a bottom grip taper shank having a taper part provided with a first, tapered surface and being configured to be closely fitted in the conical tapered bore of the spindle with said first, tapered surface being constrained against the bore surface, said bottom grip taper shank further having a flange provided with a groove in an end surface thereof which faces the end surface of the spindle when the bottom grip taper shank is fitted in the conical tapered bore, the end surface of said flange constituting a second surface to be constrained when the bottom grip taper shank is fitted in the conical tapered bore; and a removable collar which fits around said bottom grip taper shank and which, when said bottom grip taper shank is fitted in the conical tapered bore, is interposed between and bears against both the end surface of the flange and the end surface of the spindle to constrain the end surface of the flange, said collar having a ridge which fits in the groove of the flange and which, in cooperation with said groove, acts to restrain the collar when said two-surface constrainable tool is in use.

2. The two-surface constrainable tool according to claim 1, wherein the collar is circular and the ridge is circular and extends along an inner circumference of the circular collar.

3. The two-surface constrainable tool according to claim 2, wherein the collar consists of two symmetrical parts.

4. The two-surface constrainable tool according to claim 2, wherein the collar is provided with magnets to hold the collar on the end surface of the flange by magnetic attraction.

5. The two-surface constrainable tool according to claim 4, wherein the magnets are embedded in a surface of the collar from which the ridge rises so that the surfaces of the magnets are flush with the same surface of the collar.

* * * * *